J. GORNIAK.
ANIMAL TRAP.
APPLICATION FILED JAN. 22, 1921.
1,384,611.
Patented July 12, 1921.
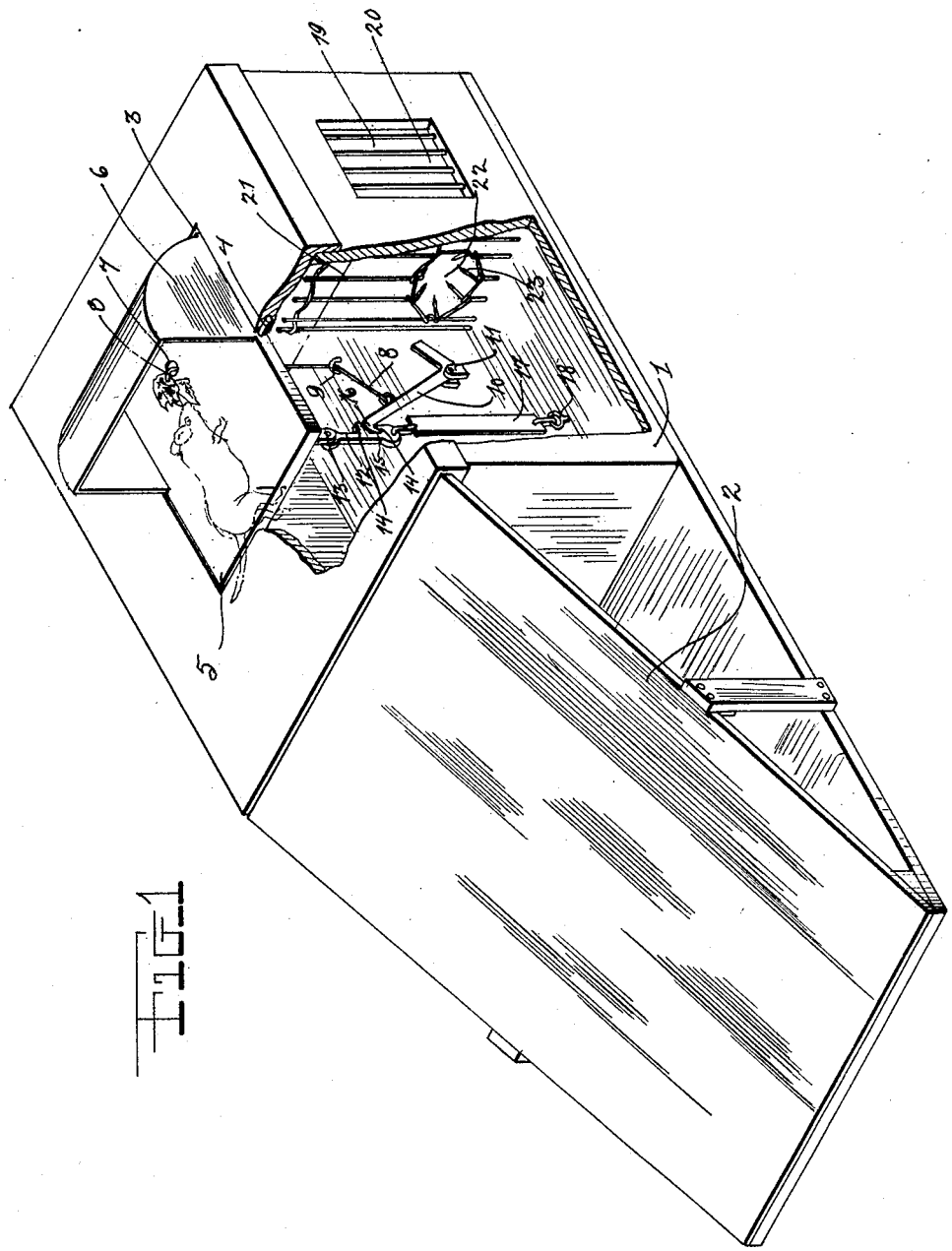
INVENTOR.
Jozef Gorniak
BY
ATTORNEY.

UNITED STATES PATENT OFFICE.

JOZEF GORNIAK, OF DENVER, COLORADO.

ANIMAL-TRAP.

1,384,611.  Specification of Letters Patent.  Patented July 12, 1921.

Application filed January 22, 1921. Serial No. 439,182.

*To all whom it may concern:*

Be it known that I, JOZEF GORNIAK, a citizen of the United States, residing at Denver, in the county of Denver and State of Colorado, have invented certain new and useful Improvements in Animal-Traps, of which the following is a specification.

The main object of this invention is to provide a secure and quick-acting multiple trap for the capture alive of small animals, particularly mice or rats.

The above and other objects will become apparent in the description below, in which like-named characters of reference refer to like-named parts in the drawings.

Referring briefly to the drawings, the figure is a perspective view of my device, partly in section.

Referring now in detail to the drawings, the numeral 1 represents a hollow box or frame, having an inclined runway 2 approaching the upper surface thereof. A substantially rectangular recess 3 is cut in said upper surface, and a shaft 4 is pivotally mounted in the sides of said recess. A platform 5 is rigid with said shaft, and is adapted normally to close said recess. The rear half of the platform 5 is provided with a substantially cylindrical cover 6, and the platform 5 is provided with a hole 7 under said cover. A cord 8 passes through said hole, and through a guide 9 on the floor of the box, and thence to a balanced member 10, pivotally mounted at 11 on the floor. Said member is so balanced, as shown that a slight tug on the cord 8 will cause its movement in a clockwise direction.

A link 12 is suspended at 13 from the lower surface of the forward end of the platform 5, and is provided with a pair of spaced-apart jaws 14 forming a recess 15 between said jaws. The upper end of the member 10 is provided with a hook 16 adapted to engage the recess 15. An elastic band 17 is attached at 18 to the floor of the box, and at its upper end to the link 12. A window 19 is provided as shown, in a compartment 20 of said box, said compartment being separated from the remainder of the box by a grated wall 21 having a recess 22 therein, the periphery of said recess being provided with inclined, pointed spikes 23, so that an animal may enter the compartment 20 after being entrapped, but cannot leave the same.

The operation of the device is now apparent. The animal, attracted by the bait on the end of the cord 8 on the platform 5, walks up the runway 2 and onto the platform 5. Upon tugging upon the bait, the cable 8 will cause the hook 16 to disengage from the recess 15, thus allowing the platform 5 to be rotated in a counter-clockwise direction by the force of the band 17. Thus the animal is pitched into the box, and the platform 5 will again rise to close the recess 3, as the force of the band 17 without the weight of the animal, is insufficient to pull the platform down. The animal, having been entrapped, will be attracted by the light appearing through the window 19, and will enter the compartment 20 through the recess 22. As soon as the animal has been thrown from the platform 5, the latter will rotate, by virtue of the momentum created by its own weight, back into its original position, allowing at the same time the member 10, also by its own weight, to rotate in the direction of the link 12, since the cable 8 will have been slackened. Thus the hook 16 will also resume its original position in the recess 15. Thus a number of animals may be entrapped by my device without any resetting.

I claim:

1. A device of the class described comprising a box, a recess in the upper surface thereof, a platform pivotally mounted in said recess, a link pivotally attached to the underside of said platform, a recess in said link, a resilient member urging said link downward, a member pivotally mounted on the floor of said box, a hook on the end of said member normally engaging said second-named recess, and a cord attached to said last-named member and extending to said platform.

2. A device of the class described comprising a box, a recess in the upper surface of said box, a platform pivotally mounted in said recess, a link pivotally attached to the underside of said platform, a recess in said link, a resilient member urging said link downward, a member pivotally mounted on the floor of said box, a hook on the end of said member normally engaging said second-named recess, and a cord attached to said last-named member, a hole in said platform, said cord passing through said hole, and bait attached to the end of said cord on said platform.

In witness whereof I affix my signature.

JOZEF GORNIAK.

Witness:

ANDY $\overset{\text{his}}{\underset{\text{mark}}{\times}}$ KONECKI.